United States Patent
Pelc et al.

(10) Patent No.: US 10,574,361 B2
(45) Date of Patent: Feb. 25, 2020

(54) OPTICAL PHASE MODULATORS

(71) Applicant: HEWLETT PACKARD ENTERPRISE DEVELOPMENT LP, Houston, TX (US)

(72) Inventors: Jason Pelc, Palo Alto, CA (US); Ashkan Seyedi, Palo Alto, CA (US); Marco Fiorentino, Mountain View, CA (US)

(73) Assignee: Hewlett Packard Enterprise Development LP, Houston, TX (US)

(*) Notice: Subject to any disclaimer, the term of this patent is extended or adjusted under 35 U.S.C. 154(b) by 0 days.

(21) Appl. No.: 15/750,493

(22) PCT Filed: Aug. 6, 2015

(86) PCT No.: PCT/US2015/043937
§ 371 (c)(1),
(2) Date: Feb. 5, 2018

(87) PCT Pub. No.: WO2017/023323
PCT Pub. Date: Feb. 9, 2017

(65) Prior Publication Data
US 2019/0020419 A1  Jan. 17, 2019

(51) Int. Cl.
*H04B 10/50* (2013.01)
*H04B 10/556* (2013.01)
(Continued)

(52) U.S. Cl.
CPC ..... *H04B 10/5561* (2013.01); *G02B 6/29353* (2013.01); *G02F 1/2257* (2013.01);
(Continued)

(58) Field of Classification Search
CPC .................. H04B 10/5051; H04B 10/5053
See application file for complete search history.

(56) References Cited

U.S. PATENT DOCUMENTS 6,388,786 B1 * 5/2002 Ono .................. H04B 10/505
375/291
6,785,000 B2  8/2004 Liang et al.
(Continued)

FOREIGN PATENT DOCUMENTS

WO  WO-2009048572 A1  4/2009

OTHER PUBLICATIONS

International Search Report & Written Opinion received in PCT Application No. PCT/US2015/043937, dated May 9, 2016, 11 pages.
(Continued)

*Primary Examiner* — Shi K Li
(74) *Attorney, Agent, or Firm* — Sheppard Mullin Richter & Hampton LLP

(57) ABSTRACT

In one example, an apparatus includes e first beam splitter having a first output and a second output. A first optical waveguide is coupled to the first output, and a second optical waveguide is coupled to the second output. A first tunable phase delay is further coupled to the second optical waveguide and has a third output. A first set of phase modulators is coupled to the first optical waveguide, and a second set of phase modulators is coupled to the third output of the first tunable phase delay. At least one of the first set of phase modulators and the second set of phase modulators includes a phase modulator that is driven to three or more distinct phase states. A second beam splitter has a first input coupled to the first optical waveguide and a second input coupled to the second optical waveguide.

15 Claims, 5 Drawing Sheets

(51) Int. Cl.
*G02B 6/293* (2006.01)
*G02F 1/225* (2006.01)
*G02F 1/21* (2006.01)

(52) U.S. Cl.
CPC ..... *H04B 10/505* (2013.01); *G02F 2001/212* (2013.01); *G02F 2203/15* (2013.01)

(56) References Cited

U.S. PATENT DOCUMENTS

| | | |
|---|---|---|
| 6,943,931 B1 | 9/2005 | Dingel et al. |
| 8,457,453 B2 | 6/2013 | Lipson et al. |
| 8,588,556 B1 * | 11/2013 | Dong ................... G02F 1/025 359/237 |
| 2011/0091221 A1 * | 4/2011 | De Gabory .......... H04B 10/505 398/188 |
| 2013/0077976 A1 | 3/2013 | Dong et al. |
| 2014/0064734 A1 | 3/2014 | Witzens |
| 2014/0348460 A1 | 11/2014 | Dorin et al. |
| 2015/0063819 A1 * | 3/2015 | Noguchi ............... H04B 10/40 398/135 |

OTHER PUBLICATIONS

Sacher, W.D. et al., "Microring Quadrature Modulators," Opt Lett Dec. 2009, 5 pages, http://www.pubfacts.com/detail/20016644/Microring-quadrature-modulators.

* cited by examiner

OPTICAL PHASE MODULATORS

BACKGROUND

Various formats may be utilized for optical signal modulation in silicon photonics, including, return-to-zero (RZ) and non-return-to-zero (NRZ) on-off keying (OOK), RZ and NRZ differential phase shift keying (DPSK), quadrature phase shift keying (QPSK), and so forth. Advanced modulation formats such as four-level quadrature amplitude modulation (QAM-4), sixteen-level quadrature amplitude modulation (QAM-16), and four-level pulse amplitude modulation (PAM-4) formats, may also be utilized in complementary metal-oxide-semiconductor (CMOS) based integrated circuits for optical signal modulation. A goal of these advanced modulation formats is to increase the spectral efficiency, i.e., the information rate that can be transmitted over a given bandwidth, of a communication system.

DETAILED DESCRIPTION

In one example, the present disclosure describes an optical transmitter for advanced modulation formats suitable for dense wavelength-division multiplexed (WDM) networks. To increase the bandwidth of a WDM optical communication network, one may either increase the modulation rate per channel or add more channels. Increasing the modulation rate beyond double the clock rate of a computer system would be likely to involve integration of power-hungry transmit and receive electronics. Increasing the number of channels would be likely to involve narrowing the channel spacing, which may result in crosstalk, or using a wider optical spectrum, which would make it challenging to find a light source with a wide enough bandwidth.

A goal of advanced modulation formats, such as four-level quadrature amplitude modulation (QAM-4), sixteen-level quadrature amplitude modulation (QAM-16), and four-level pulse amplitude modulation (PAM-4), is to increase the spectral efficiency, i.e., the information rate that can be transmitted over a given bandwidth, of a communication system. One way to accomplish this is to add symbols past the binary alphabet {0, 1} to encode more bits per clock period. The PAM-4 format encodes these bits in four different intensity levels {0, 1, 2, 3} to achieve two bits per symbol. The QAM formats are generalizations in which information is encoded onto two quadratures, which can be thought of as the real and imaginary pans of a complex-valued field.

The present disclosure describes a low-footprint integrated optical transmitter for advanced modulation formats such as QAM-4 or QAM-16, among other formats. Examples of the present disclosure include a device based on a Mach-Zehnder interferometer saving a first arm and a second arm. Each of the first arm and the second arm may be loaded by one or more overcoupled ring resonator modulators, and one or more of the modulators may be programmed with three or more phase states. Thus, each wavelength of light propagating through the device can be subjected to a different modulation. The resulting device is a multi-channel modulator that provides increased spectral efficiency and higher data rates with a modest increase in hardware complexity.

The present disclosure is primarily described in terms of wavelengths of light, e.g., resonance wavelengths of phase modulators. However, it should be understood that the description of operations pertaining to a wavelength or wavelengths of light also necessarily include operations pertaining to a frequency or frequencies of light, insofar as the two parameters of wavelength and frequency of light have an immutable relationship.

Figure 1:
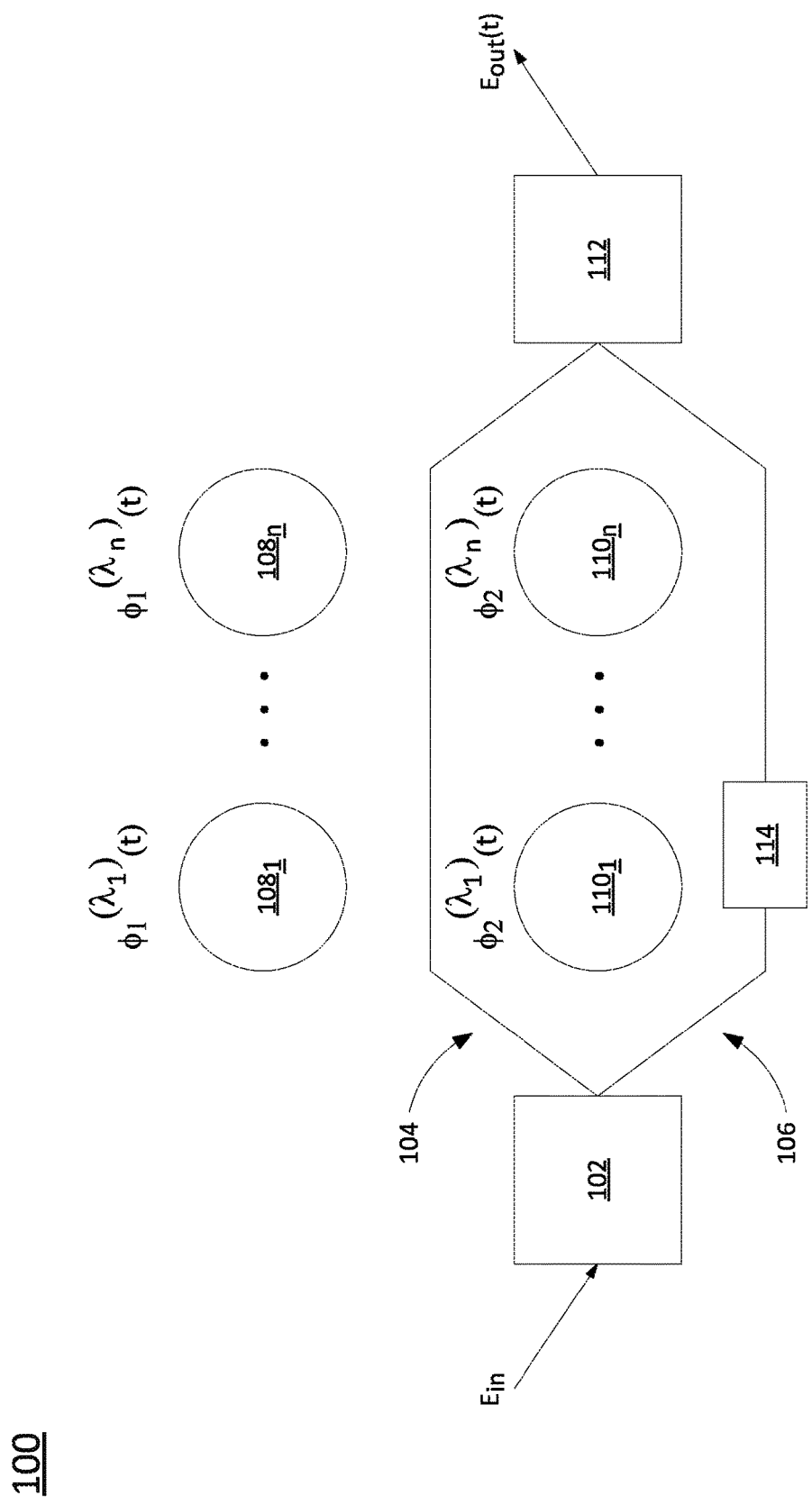
FIG. 1 is a schematic diagram illustrating one example of an advanced modulation format modulator for wavelength-division multiplexed signals.

FIG. 1 is a schematic diagram illustrating one example of an advanced modulation format modulator 100 for wavelength-division multiplexed signals. The modulator 100 receives an unmodulated optical signal $E_{in}$, containing a number n of optical carrier signals or continuous wave (cw) laser lines each having a different wavelength $(\lambda_1, \ldots, \lambda_n)$. The optical signal may be generated by a coherent light source (not shown) such as a laser, a laser diode, a hybrid silicon laser, or other solid-state or integrated circuit light source. In one example, the optical signal source may provide light of multiple discrete wavelengths. For instance, the optical signal source may comprise a plurality of laser diodes, each generating light at a different discrete wavelength.

Generally, the modulator 100 is based on a Mach-Zehnder interferometer. Thus, as illustrated, the unmodulated optical signal $E_{in}$ is coupled to one port of a first beam splitter 102. The first beam splitter 102 may be a 50/50 beam splitter and may be made in integrated optics using, for example, a directional coupler or a multimode interference device.

The first beam splitter 102 includes a first output and a second output, which respectively define a first arm 104 and a second arm 106 of the Mach-Zehnder interferometer. In one example, the first arm 104 and the second arm 106 each comprise an optical waveguide such as a bus waveguide for guiding a respective portion of the unmodulated optical signal $E_{in}$. In one example, the second arm 106 includes a phase shifter 114 for introducing a tunable phase delay in the second arm 106 relative to the first arm 104. In one example, the tunable phase delay is a delay of anywhere between zero and $2\pi$. For instance, if the modulator 100 is configured for QAM formats, the phase shifter 114 may be tuned to introduce a phase delay of $\pi/2$ in the second arm 106. However, if the modulator 100 is configured for another format, the phase shifter 114 may be tuned to set the phase delay to zero. Thus, the output of the phase shifter 114 is a portion of the unmodulated optical signal $E_{in}$ in which all n wavelengths experience approximately the same phase shift.

The first arm 104 is coupled to a first set of n phase modulators $108_1$-$108_n$, hereinafter collectively referred to as "phase modulators 108", while the second arm 106 is coupled to a second set of n phase modulators $110_1$-$110_n$, hereinafter collectively referred to as "phase modulators 110." Thus, in one example, each set of phase modulators 108, 110 includes one phase modulator per transmitted wavelength of the unmodulated optical signal $E_{in}$. That is, each phase modulator 108, 100 resonates at a different wavelength ($\lambda_1, \ldots, \lambda_n$).

In one example, each phase modulator 108, 110 in the first and second sets of phase modulators comprises a ring resonator, or integrated circuit-based ring waveguide, which is chosen to be deliberately overcoupled. In one example, one or more of the ring resonators is nine times overcoupled. In another example, one or more of the ring resonators is fifty percent overcoupled. Within the context of the present disclosure, a ring resonator is said to be "overcoupled" when the coupling rate between the ring resonator and the bus waveguide (i.e., the first arm 104 or the second arm 106 in the present case) is greater than the ring resonator's internal loss rate (which may be due to scattering, absorption, or radiation losses, for example). Thus, when a ring resonator is fifty percent overcoupled, the coupling rate between the ring resonator and the bus waveguide is fifty percent greater than the ring resonator's internal loss rate. Mathematically, this can be expressed as: (coupling rate)/(internal loss)=1.5.

One or more of the phase modulators 108, 110 in the first and second sets of phase modulators may include a heater or other mechanism for tuning or shifting the resonant wavelength of the phase modulator. Each of phase modulators 108, 110 is channel selective. In one example, channel selectivity is accomplished by changing the optical path length, i.e., perimeter size, of the phase modulators 108, 110. Thus, in this case, each of the first and second sets of phase modulators will include n phase modulators having n differently-sized perimeters. For example, the sizes of the phase modulators 108 or 110 may increase along the direction in which light propagates along the first arm 104 or second arm 106, respectively. Although the phase modulators 110 are illustrated as being positioned such that the optical signal will encounter the phase modulators after encountering the phase shifter 114. i.e., as the optical earner propagates through the modulator 100, it will be appreciated that the phase modulators 110 could alternatively be positioned so that the optical signal encounters the phase modulators 110 before encountering the phase shifter 114.

Figure 2:
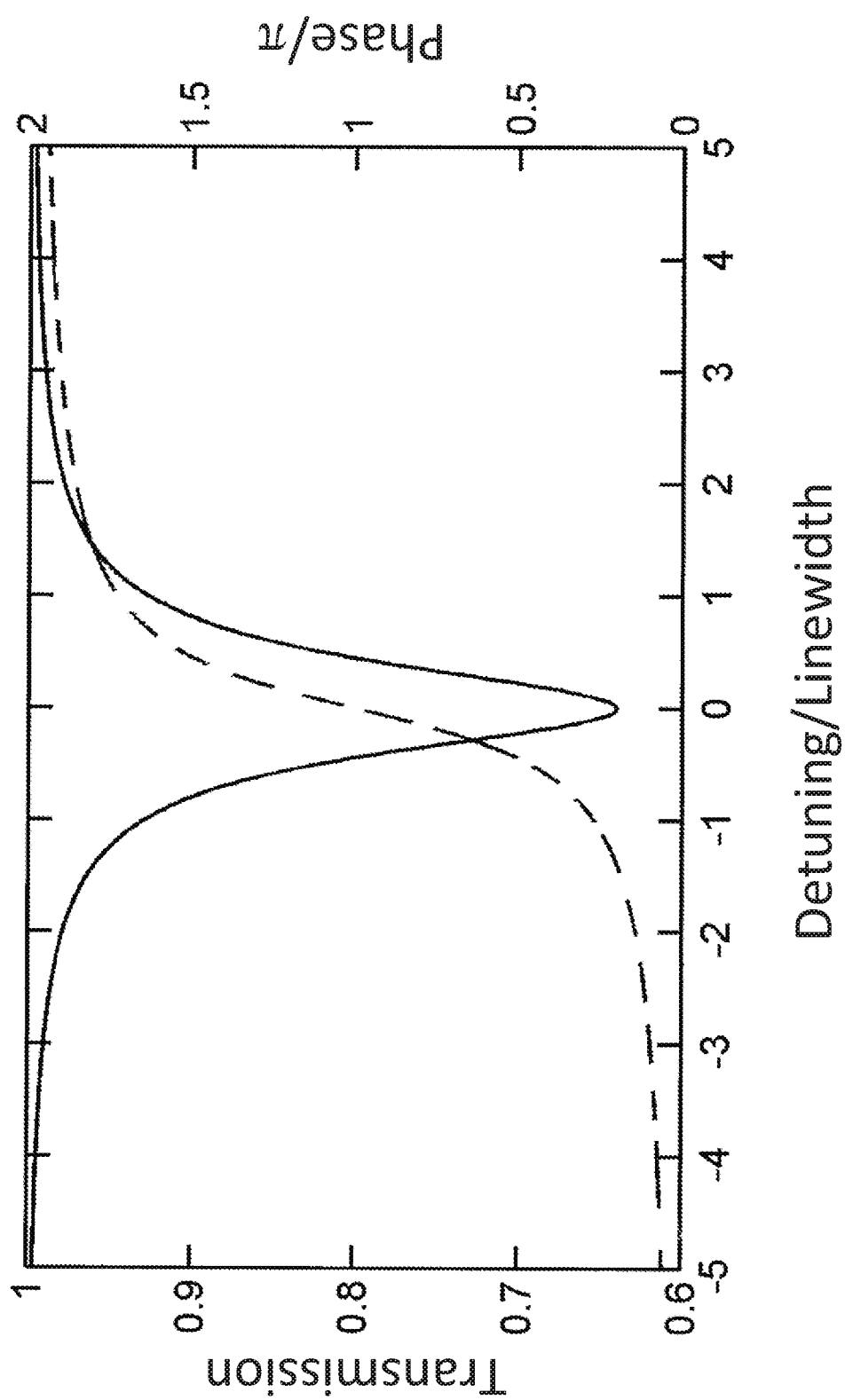
FIG. 2 is a graph illustrating the transmission and phase characteristics for an example overcoupled phase modulator such as one of the phase modulators illustrated in FIG. 1.

FIG. 2 is a graph illustrating the transmission and phase characteristics for an example overcoupled phase modulator such as one of the phase modulators 108 and 110 illustrated in FIG. 1. In particular, FIG. 2 demonstrates the transmitted intensities and phases for light passing by the example overcoupled phase modulator, where the external coupling is equal to approximately nine times ring losses. The transmission as a function of detuning/line width is indicated by the solid-lined curve, while the phase as a function of detuning/tine width is indicated by the dashed-line curve.

In the overcoupled configuration, each phase modulator 108, 110 will have the transmission and phase characteristics illustrated in FIG. 2. For instance, on resonance, the transmission of each phase modulator 108, 110 will drop to approximately sixty-five percent of its non-resonant transmission, while, within one line width, the phase will sweep by more than $\pi$ radians. Thus, by modulating the resonant wavelength of the phase modulators 108 and 110, which can be accomplished using carrier injection, the electro-optic effect, or other refractive index modulation techniques, the phase of light near the resonant wavelength of a particular phase modulator 108, 110 is modulated. At the same lime, light of other wavelengths is not modulated by the particular phase modulator 108, 110.

Thus, referring back to FIG. 1, each of the first arm 104 and the second arm 106 includes one phase modulator 108 or 110 that is resonant with each of the n channels of the unmodulated optical signal $E_{in}$, i.e., one phase modulator per channel. Each of the phase modulators 108 and 110 is therefore used to modulate the phase of a corresponding optical channel while leaving all other channels unmodulated.

Each of the first arm 104 and the second arm 106 is further coupled to a second beam splitter 112, which recombines the phase-modulated optical signals on the first arm 104 and the second arm 106 to produce a QAM signal ($E_{out}(t)$). The second beam splitter 112 may be a 50/50 beam splitter and may be made in integrated optics using, for example, a directional coupler or a multimode interference device.

For QAM-4, phase states of the phase modulators that are symmetrically placed on either side of the resonance (e.g., 0.44 line widths to either side) will have a phase difference of $\pi$ between them and have equal intensities. Thus, residual amplitude modulation is unlikely to degrade device performance.

However, in some examples of the present disclosure, one or more of the phase modulators are driven to three or more distinct phase states, rather than to a binary set of phase states, e.g., on either side of and equidistant from resonance. That is, three or more points on the modulation curves of the phase modulators are selected as potential phases for the phase modulators. In particular, the drivers controlling the frequencies of the phase modulators 108, 110, which set the phase and/or amplitude of the light transmitted by the phase modulators, include at least three settings to which they drive. Each driver applies an electrical voltage to its respective phase modulator to shift the phase modulator's resonant frequency, which in turn changes the detuning of an optical signal that is coupled to the phase modulator. This is possible due to the linearity in the phase responses of the overcoupled phase modulators, as illustrated in FIG. 2.

Figure 3:
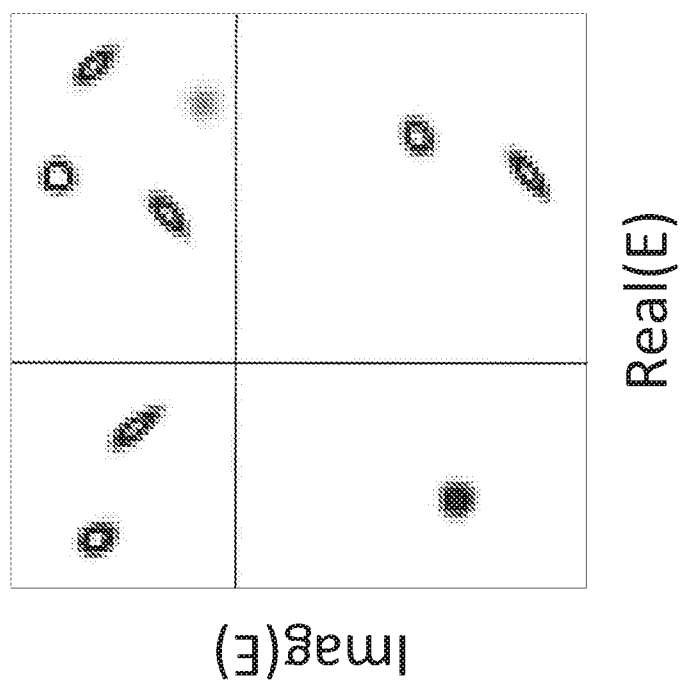
FIG. 3 is a constellation diagram illustrating a signal modulated by an example phase modulator that is programmed with three phase slates.

FIG. 3 is a constellation diagram illustrating a signal modulated by an example phase modulator that is programmed with three phase states. The example phase modulator in this case is fifty percent overcoupled. As illustrated, when three or more discrete phases per phase modulator are used in this manner, the constellation diagram is expanded relative to the constellation diagram for a device implementing phase modulators as binary elements, i.e., there are more points or "stars" in the constellation. For instance, if there are exactly three settings for a given driver, and if the phases are set with unequal spacing (e.g., $[-0.5, -0.25, 0.4]*\pi$), a nine-point constellation results. The nine-point constellation can be used to transmit up to approximately $\log_2(9)=3.16$ bits per symbol. In this case, 3.16 is rounded down to three bits, which means that the encoding of a signal should be specified to use only eight points in the nine-point constellation. Thus, it is possible to generate higher-order QAM patterns, e.g., DWDM $2^N$-QAM, using the modulator 100 illustrated in FIG. 1.

Although the constellation diagram is "irregular," i.e., asymmetric, the ability to distinguish between the individual constellation points does not depend critically on the coupling parameters of the phase modulators 108, 110. Specifically, although the ratio of the bus-phase modulator coupling and the loss of the phase modulator can vary dramatically, and can inadvertently couple the desired phase modulation to amplitude modulation, the constellation diagram remains unambiguous. For instance, the further away the individual points in the constellation diagram are from each other, the easier it is for a receiver to distinguish the different phase states. The combination of the unequal spacing of the phases and the phase-amplitude coupling helps this. Thus, although residual amplitude modulation is exacerbated when modulating with three or more phase slates per phase modulator, the residual amplitude modulation can actually help to increase the distance between the individual points in the constellation diagram and make it easier to distinguish between phase states.

Additionally, changing the relative phase between the first arm 104 and the second arm 106 of the modulator 100, e.g., from π/2 to other values, also changes the shape of the constellation diagram. This further allows one to locate parameter regions having the largest distances between constellation points.

Figure 4:
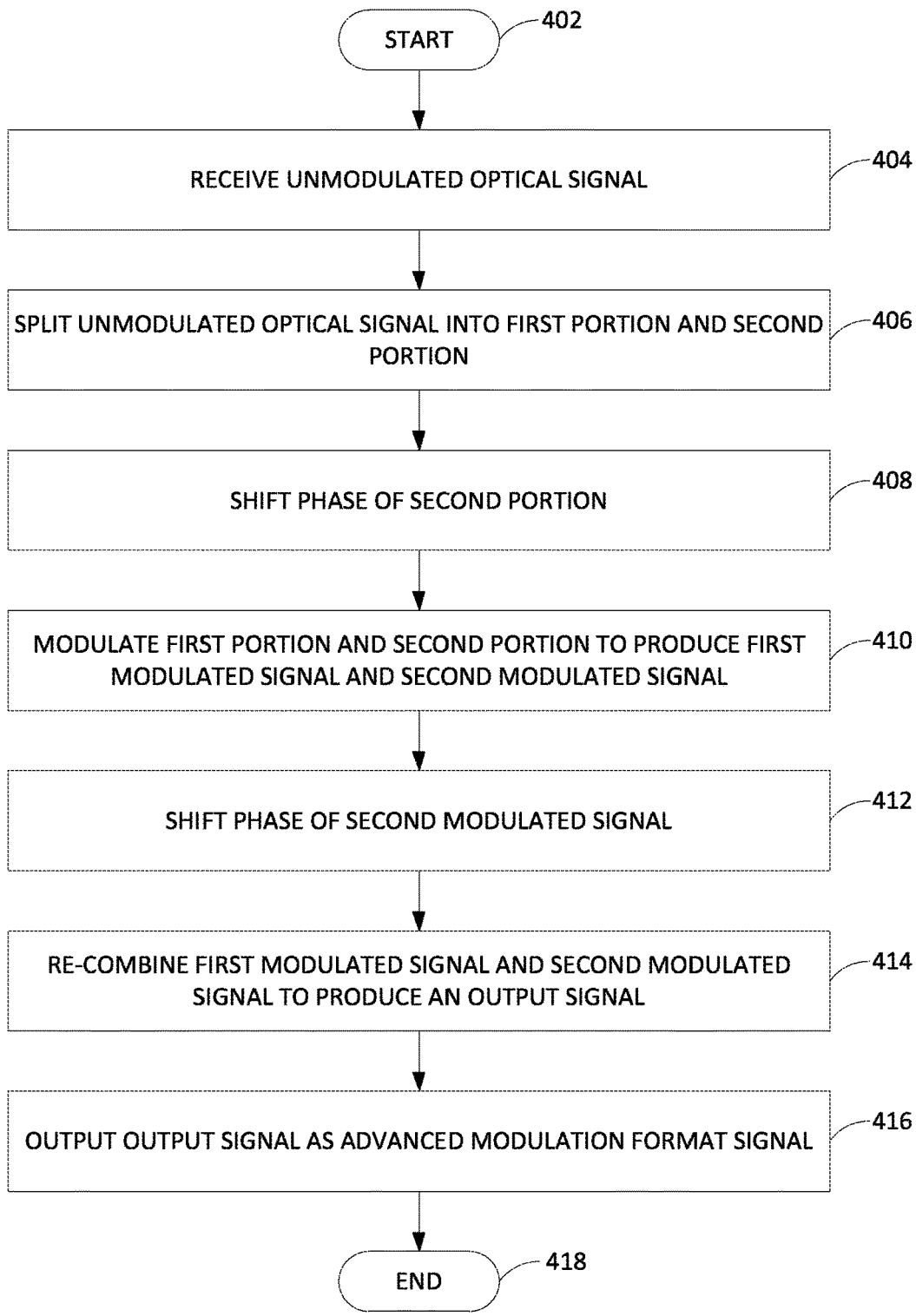
FIG. 4 illustrates a flowchart of an example method for modulating an optical signal.

FIG. 4 illustrates a flowchart of an example method 400 for modulating an optical signal. The method 400 may be performed, for example, by any one of the components of the modulator 100 of FIG. 1. Alternatively, or in addition, at least one of the blocks of the method 400 may be implemented by a computing device having a processor, a memory, and input/output devices as illustrated below in FIG. 5, specifically programmed to perform the blocks of the method, e.g., by operating as a control circuit for the modulator 100. Although a computing device may be specifically programmed to perform various blocks of the method 400, the method will now be described in terms of an example where blocks of the method are performed by a modulator device, such as modulator 100 in FIG. 1.

The method 400 begins in block 402. In block 404, the first beam splitter 102 receives an unmodulated optical signal $E_{in}$ comprising a plurality of optical carrier signals. For example, the optical signal may be generated by a coherent optical signal source, such as a laser, a laser diode, a hybrid silicon laser, or other integrated circuit light source.

In block 406, the first beam splitter 102 splits the unmodulated optical signal $E_{in}$ into a first portion and a second portion. The first portion is forwarded, via a first output of the first beam splitter 102, to the first arm 104 of the modulator 100, while the second portion is forwarded, via a second output of the first beam splitter 102, to the second arm 106 of the modulator 100.

In block 408, the phase shifter 114 may shift the phase of the second portion of the optical signal $E_{in}$. In one example, as a result of the shift, a phase is induced on the second arm 106 that is characterized by a phase delay of π/2 relative to a phase of the first arm 104. Block 408 may be performed in examples where the modulator 100 includes a phase shifter that is positioned before a set of phase modulators, as discussed above. That is, the phase shifter 114 of FIG. 1 may be positioned between the first beam splitter 102 and the second set of phase modulators 110.

In block 410, the first set of phase modulators 108 and the second set of phase modulators 110 modulate the first portion of the optical signal and the second portion of the optical signal to produce a first modulated signal and a second modulated signal, respectively. In one example, at least one of the phase modulators 108, 110 is programmed with three or more phase states.

In block 412, the phase shifter 114 may shift the phase of the second portion of the optical signal. In one example, as a result of the shift, a phase is induced on the second arm 106 that is characterized by a phase delay of π/2 relative to a phase of the first arm 104. Block 412 may be performed in examples where the modulator 100 includes a phase shifter that is positioned after a set of phase modulators, as discussed above. Thus, the method 400 may include one or both blocks 408 and 412 or neither of blocks 408 and 412. That is, the phase shifter 114 of FIG. 1 may be positioned between the second set of phase modulators 110 and the second beam splitter 112.

In block 414, the second beam splitter 112 recombines the first and second modulated signals propagating on the first arm 104 and the second arm 106 to produce an output signal.

In block 416, the second beam splitter 112 outputs the output signal $E_{out}(t)$ as an advanced modulation format signal e.g., a QAM signal.

The method 400 ends in block 418.

Figure 5:
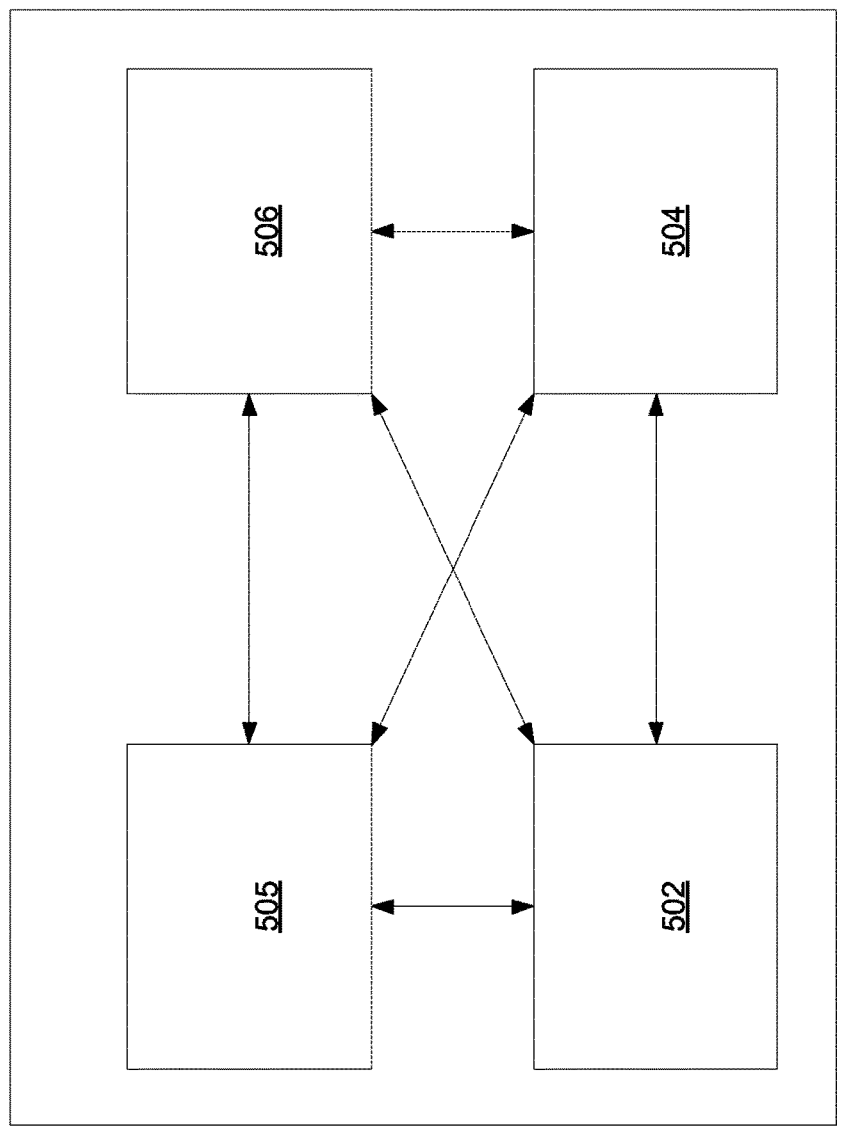
FIG. 5 depicts a high-level block diagram of a computing device suitable for use in performing the functions described herein.

FIG. 5 depicts a high-level block diagram of a computing device suitable for use in performing the functions described herein. As depicted in FIG. 5, the computing device 500 comprises a hardware processor element 502. e.g., a central processing unit (CPU), a microprocessor, or a multi-core processor, a memory 504, e.g., random access memory (RAM), a module 505 for modulating an optical carrier signal, and various input/output devices 506, e.g., storage devices, including but not limited to, a tape drive, a floppy drive, a hard disk drive or e compact disk drive, a receiver, a transmitter, a speaker, a display, a speech synthesizer, an output port, an input port and a user input device, such as a keyboard, a keypad, a mouse, a microphone, and the like. Although one processor element is shown, it should be noted that the general-purpose computer may employ a plurality of processor elements. Furthermore, although one general-purpose computer is shown in the figure, if the method(s) as discussed above is implemented in a distributed or parallel manner for a particular illustrative example, i.e., the blocks of the above method(s) or the entire method(s) are implemented across multiple or parallel general-purpose computers, then the general-purpose computer of this figure is intended to represent each of those multiple general-purpose computers.

It should be noted that the present disclosure can be implemented by machine readable instructions and/or in a combination of machine readable instructions and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the blocks, functions and/or operations of the above disclosed methods.

In one example, instructions and data for the present module or process 505 for modulating an optical carrier signal, e.g., machine readable instructions, can be loaded into memory 504 and executed by hardware processor element 502 to implement the blocks, functions, or operations as discussed above in connection with the example method 400. Furthermore, when a hardware processor executes instructions to perform "operations," this could include the hardware processor performing the operations directly and/or facilitating, directing, or cooperating with another hardware device or component, e.g., a co-processor and the like, to perform the operations.

The processor executing the machine readable instructions relating to the above described method(s) can be perceived as a programmed processor or a specialized processor. As such, the present module 505 for modulating an optical carrier signal, including associated data structures, of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, the computer-readable storage device may comprise any physical device or devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, or variations therein may be subsequently made, which are also intended to be encompassed by the following claims.

What is claimed is:

1. An apparatus, comprising:
a first beam splitter having a first output and a second output;
a first optical waveguide coupled to the first output;
a first set of phase modulators coupled to the first optical waveguide, each phase modulator of the first set of phase modulators resonating at a respectively distinct wavelength;
a second optical waveguide coupled to the second output;
a first tunable phase delay coupled to the second optical waveguide and having a third output;
a second set of phase modulators coupled to the third output of the first tunable phase delay, each phase modulator of the second set of phase modulators resonating at a respectively distinct wavelength;
second beam splitter having a first input coupled to the first optical waveguide and a second input coupled to the second optical waveguide; and
one or more drivers setting each of the phase modulators of the first set of phase modulators and the second set of phase modulators to three or more distinct phase states, wherein each of the one or more drivers includes three settings and each setting corresponding to a respective point on a modulation curve of a phase modulator and further corresponding to a respective phase state that the phase modulator is driven to by the driver,
wherein each of the phase modulators of the first set of phase modulators and the second set of phase modulators is driven to the three or more distinct phase states such that each of the distinct wavelengths resonated by each of the phase modulators are subjected to a different modulation as driven by a set phase state from the three of more distinct phase states.

2. The apparatus of claim 1, wherein the first set of phase modulators and the second set of phase modulators each comprise a plurality of overcoupled ring resonator modulators.

3. The apparatus of claim 2, wherein at least one of the first set of phase modulators and the second set of phase modulators includes a phase modulator that is fifty percent overcoupled.

4. The apparatus of claim 1, wherein the first set of phase modulators and the second set of phase modulators each comprise one phase modulator that is resonant with each wavelength of light present in an optical signal comprising a plurality of optical carrier signals to be modulated by the apparatus.

5. The apparatus of claim 1, wherein the first tunable phase delay is tuned to introduce a phase delay of $\pi/2$ in the second optical waveguide relative to the first optical waveguide.

6. The apparatus of claim 1, wherein the first tunable phase delay is tuned to introduce a phase delay between zero and $2\pi$ in the second optical waveguide relative to the first optical waveguide.

7. The apparatus of claim 1, wherein the first tunable phase delay is positioned between the first beam splitter and the second set of phase modulators.

8. The apparatus of claim 1, wherein each phase modulator of the first set of phase modulators and the second set of phase modulators are channel selective by each of the phase modulators having a perimeter of a respectively distinct size.

9. The apparatus of claim 1, wherein relative spacings between the three or more phase states are unequal.

10. A method, comprising:
splitting an unmodified optical signal into a first portion and a second portion;
setting each of a first set of phase modulators to a setting selected from three settings, where each of the three settings corresponds to a respective point on a modulation curve of a phase modulator from the first set of phase modulators and further corresponds to a respective phase state that the phase modulator from the first set of phase modulators is driven to;
setting each of a second set of phase modulators to a setting selected from three settings, wherein each of the three settings corresponds to a respective point on a modulation curve of a phase modulator from the second set of phase modulators and further corresponds to a respective phase state that the phase modulator from the second set of phase modulators is driven to;
modulating the first portion using the first set of phase modulators to produce a first modulated signal, wherein each phase modulator of the first set of phase modulators resonates at a respectively distinct wavelength based on the corresponding setting;
modulating the second portion using the second set of phase modulators to produce a second modulated signal, wherein each phase modulator of the second set of phase modulators resonates at a respectively distinct wavelength based on the corresponding setting; and
recombining the first modulated signal and the second modulated signal to produce an advanced modulation format signal,
wherein each of the phase modulators of the first set of modulators and the second set of phase modulators is driven to three or more distinct phase states such that each of the distinct wavelengths resonated by each of the phase modulators are subjected to a different modulation as driven by a set phase state from the three of more phase states.

11. The method of claim 10, further comprising:
shifting a phase of the second portion relative to the first portion, subsequent to the splitting, but prior to the modulating the signal.

12. The method of claim 11, wherein the shifting induces a phase shift in the second portion of $\pi/2$ relative to the first portion.

13. The method of claim 10, further comprising:
shifting a phase of the second portion relative to the first portion, subsequent to the modulating the second portion, but prior to the recombining.

14. The method of claim 13, wherein the shifting induces a phase shift in the second portion of $\pi/2$ relative to the first portion.

15. The method of claim 10, wherein relative spacings between the three or more phase states are unequal.

* * * * *